United States Patent [19]
Setoyama et al.

[11] Patent Number: 5,907,054
[45] Date of Patent: May 25, 1999

[54] PROCESS FOR THE POLYMERIZATION OF CYCLIC ETHER

[75] Inventors: Tohru Setoyama; Yoshio Kabata; Mitsuharu Kobayashi, all of Kanagawa, Japan

[73] Assignee: Mitsubishi Chemical Corporation, Tokyo, Japan

[21] Appl. No.: 08/867,201

[22] Filed: Jun. 2, 1997

[30] Foreign Application Priority Data

Jun. 5, 1996 [JP] Japan ..................................... 8-142838

[51] Int. Cl.$^6$ ..................................................... C07C 67/24
[52] U.S. Cl. ........................... 560/91; 560/198; 560/240; 560/252; 568/617; 528/408; 528/409; 528/417
[58] Field of Search ..................................... 528/408, 409, 528/417; 560/91, 198, 240, 252; 568/617

[56] References Cited

U.S. PATENT DOCUMENTS

| | | | |
|---|---|---|---|
| 3,935,252 | 1/1976 | Tomomatsu | 260/346.1 R |
| 4,189,566 | 2/1980 | Mueller et al. | 528/408 |
| 4,803,299 | 2/1989 | Mueller | 568/617 |

*Primary Examiner*—Frederick Krass
*Attorney, Agent, or Firm*—Dilworth & Barrese

[57] ABSTRACT

The present invention provides a process for the production of an ester of polyoxyalkylene glycol on an industrially favorable basis which comprises the ring opening polymerization of a cyclic ether in the presence of a carboxylic anhydride and a solid acid polymerization catalyst to obtain a polymer esterified at some or all of the ends thereof, wherein the water content in the reaction system is maintained at not more than 30 ppm by weight during the polymerization reaction.

12 Claims, No Drawings

PROCESS FOR THE POLYMERIZATION OF CYCLIC ETHER

FIELD OF THE INVENTION

The present invention relates to a process which comprises the ring opening polymerization of a cyclic ether in the presence of a carboxylic anhydride and a polymerization catalyst to produce an ester of polyoxyalkylene glycol. More particularly, the present invention provides such a preparation process wherein as the polymerization catalyst there is used a solid acid polymerization catalyst which can be easily separated from the polymerization reaction solution and in which the deactivity of the catalyst is inhibited. Accordingly, the process of the present invention prepares an ester of polyoxyalkylene glycol from a cyclic ether on an industrially favorable basis.

BACKGROUND OF THE INVENTION

A polyoxyalkylene glycol is a straight-chain polyether glycol represented by the general formula $HO—[(CH_2)_nO]_m—H$ (in which m represents an integer of not less than 2, and n represents an integer of not less than 1) terminated by a primary hydroxyl group at both ends thereof and is normally produced by the ring opening polymerization of a cyclic ether. A particularly industrially significant cyclic ether is a polyoxytetramethylene glycol (PTMG) obtained by the polymerization reaction of tetrahydrofuran (THF). PTMG is a straight-chain polyether glycol represented by the general formula $HO—[(CH_2)_4O]_n—H$ (in which n is the polymerization degree of the compound represented by an integer of from not less than 2 to not more than 4,000) terminated by a primary hydroxyl group at both ends thereof. PTMG is industrially used as a raw material of an urethane resin-based elastic fiber which must be stretchable or elastic.

In recent years, PTMG has been used as a raw material for the manufacture of thermoplastic polyester elastomer as well. For the application as a raw material of elastic fiber or elastomer, a medium molecular weight PTMG having a number-average molecular weight (Mn) of about from 500 to 3,000 is particularly preferred.

As one of the methods for the synthesis of such a PTMG there has been proposed a process which comprises subjecting tetrahydrofuran to ring opening polymerization in the presence of a composite oxide having a Hammett's Ho index of from −10.0 to 3.0 made up of a mixture of trivalent and tetravalent oxides such as $SiO_2$—$Al_2O_3$ as a polymerization catalyst and a 1:15 to 15:1 mixture of acetic acid and acetic anhydride to obtain a polytetramethylene glycol acetate polymer (PTME) esterified at both ends thereof, and then subjecting the polymer to an alcoholysis reaction to obtain PTMG.

The foregoing solid acid polymerization catalyst enables an efficient production of PTME having a number-average molecular weight of from 500 to 4,000 within a relatively narrow distribution.

However, these methods are disadvantageous in that the continuous production of PTME involves a remarkable decreasing of the activity of the polymerization catalyst. These methods are also disadvantageous in that they result in the presence of a large amount of acetic acid in the free state in the polymerization system, causing the corrosion of the reaction vessel. Accordingly, PTME cannot be continuously produced by these methods on an industrially favorable basis.

SUMMARY OF THE INVENTION

It is therefore an object of the present invention to provide a process for the production of an ester of polyoxyalkylene glycol on an industrially favorable basis which comprises the ring opening polymerization of a cyclic ether.

The foregoing object of the present invention will become more apparent from the following detailed description and examples.

In general, the polymerization reaction of a cyclic ether in the presence of a carboxylic anhydride such as acetic anhydride proceeds under a mechanism in which the reaction is initiated by the electrophilic reaction of the cyclic ether with a carboxylic anhydride activated at a Lewis acid site, followed by the growth of the chain of the cyclic ether, and then terminates by the electrophilic reaction of acetate. In other words, as the catalyst there may be effectively used a Lewis acid catalyst. It is known that composite oxides, aluminum chloride, clay compounds, zeolite, etc. have a Lewis acid site (see Kozo Tanabe, "Metal oxide and composite oxide"). It has been noted herein that if a Lewis acid site is an active site as in this polymerization reaction, the catalyst active site is poisoned by water in a manner characteristic of a Lewis acid, thus decreasing the polymerization activity.

The cyclic ether to be subjected as a raw material to the polymerization reaction is liable to contamination by water. For example, in a preparation process which comprises subjecting butadiene to oxidative acetoxylation, and then hydrolyzing the acetoxylation product to produce 1,4-butanediol which is then dehydrated to obtain tetrahydrofuran, tetrahydrofuran thus obtained is contaminated with water resulting from the hydrolyzation reaction and dehydration reaction. In general, THF to be used as a raw material is dehydrated by distillation. However, THF cannot be completely dehydrated on an industrial basis. Thus, THF to be used as a raw material contains water in an amount of, e.g., from 100 to 600 ppm by weight. This water content suffices for the deterioration over time in the polymerization reaction employing a Lewis acid catalyst.

Thus, tetrahydrofuran to be used as a raw material preferably has a water content of not more than 100 ppm by weight. However, it was found that even if the water content of tetrahydrofuran to be used as a raw material is controlled to not more than 100 ppm by weight, water contained in the polymerization catalyst, acid anhydride, etc. contaminates the reaction system thus deteriorating the activity of the polymerization catalyst.

Extensive studies of countermeasures against the deterioration of polymerization catalyst by water have been made in accordance with the present invention. As a result, it was found that the ring opening polymerization in a polymerization reaction system having a water content of far less than the range of 100 to 500 ppm by weight, i.e., not more than 30 ppm by weight, preferably not more than 10 ppm by weight, makes it possible to reduce the deterioration of the polymerization catalyst over time. Thus, the present invention has been worked out.

The present invention provides a preparation process which comprises the ring opening polymerization reaction of a cyclic ether in the presence of a carboxylic anhydride and a solid acid polymerization catalyst to provide a polymer esterified at some or all ends thereof, characterized in that the water content in the reaction system is maintained to not more than 30 ppm by weight during the ring opening polymerization reaction.

DETAILED DESCRIPTION OF THE INVENTION

As the cyclic ether to be used as a raw material in the ring opening reaction of the present invention there may be used one having from 2 to 10 carbon atoms in the ring. Specific examples of such a cyclic ether include tetrahydrofuran (THF), ethylene oxide, propylene oxide, oxetane, tetrahydropyran, oxepan, and 1,4-dioxane. Further, cyclic ethers substituted by alkyl group, halogen atom, etc., such as 2-methyltetrahydrofuran, may be used. Among these cyclic ethers, THF is particularly suitable for the polymerization reaction of the present invention because it is a raw material for PTMG and thus is industrially important.

The water content in the cyclic ether to be used herein preferably is minimized to not more than 100 ppm by weight. However, even a cyclic ether having a water content of from 100 to 600 ppm by weight as ever may be used in the present invention.

As the polymerization catalyst there may be preferably used a solid acid catalyst comprising a Lewis acid as mentioned above. Examples of such a solid acid catalyst are as follows.

a) Catalyst obtained by a process which comprises calcining a precursor of an oxide of one or more elements selected from the group consisting of Ge, Sn, Pb, B, Al, Ga, Zn, Cd, Cu, Fe, Mn, Ni, Cr, Mo, W, Ti, Zr, Hf, Y, La, Ce, Yb, Zn and Si at a temperature as high as 600 to 1,150° C. to obtain an oxide;

b) Clay compound containing Si and Al, e.g., montmorillonite, saponite, sepiolite and mica; and c) Zeolites having a structure selected from the group consisting of BEA, EMT, ERI, EUO, FAU, HEU, LTA, LTL, MAZ, MOR, MTW, NES, OFF and TON (see W. M. Meier and D. H. Olson, "ATLAS OF ZEOLITE STRUCTURE TYPESZ", Third Edition (1992), Structure Commission of the International Zeolite Association)

These solid acid catalysts may be used singly or in combination.

Industrially useful PTMG's generally posses a number-average molecular weight of from about 500 to 4,000. The number-average molecular weight of PTMG tends to depend on the acid strength of the Lewis acid. In other words, if the strength of the Lewis acid is high, the number-average molecular weight of PTMG tends to become small. It is known in Tanabe's theory (Kozo Tanabe, "Metal oxide and composite oxide") that the strength of a Lewis acid is determined by the combination of metals. Accordingly, in order to obtain PTMG having a desired number-average molecular weight, a catalyst selected from the foregoing groups a), b) and c) which satisfies a specific acid strength (Hammett's index) [Ho (strength of acid site according to Hammett's function of acid strength) is not more than +3.3, preferably not more than −3.0, with a Hammett's indicator] is preferably used.

In the present invention, as the Lewis acid catalyst to be used as a polymerization catalyst there may be preferably used a specific metal oxide or composite metal oxide (hereinafter simply referred to as "composite oxide") belonging to the foregoing group (a). As the process for the preparation of such a Lewis acid catalyst there may be used the following process. Firstly, a precursor is obtained at a first step. By way of further detail, an acid, alkali or water is optionally added to a solution of salt or alkoxide of two or more metals selected from the group consisting of Ge, Sn, Pb, B, Al, Ga, Zn, Cd, Cu, Fe, Mn, Ni, Cr, Mo, W, Ti, Zr, Hf, Y, La, Ce, Yb, Zn and Si to form a precipitate or gel as a polymerization catalyst precursor. Examples of methods for obtaining a precipitate or gel include an impregnation method, sol-gel method, kneading method and dipping method. A method is particularly effective method which comprises having a metal salt/or metal alkoxide supported on a proper carrier, and then allowing a basic substance such as alkali and amine to come into contact with the material in the solid state (i.e., substantially water-free state) to obtain the desired polymerization catalyst precursor.

At a second step, the polymerization catalyst precursor thus obtained is optionally filtered, washed, and then dried. The polymerization catalyst precursor is then calcined at a temperature of from 600° C. to 1,150° C. in an inert gas atmosphere such as nitrogen or argon or oxidizing gas atmosphere such as air or diluted oxygen gas to obtain the desired oxide (solid acid polymerization catalyst). The calcining is normally effected at a temperature of from 600° C. to 1,150° C., preferably from 600° C. to 1,000° C. When the polymerization catalyst precursor is calcined at a high temperature, a polymerization catalyst having enhanced activity and stability can be obtained.

In the present invention, the water content in the polymerization reaction system is reduced to and maintained at not more than 30 ppm by weight, preferably not more than 20 ppm by weight, more preferably not more than 10 ppm by weight by the action of a hydrolyzation catalyst during the ring opening polymerization reaction of a cyclic ether. If the water content in the polymerization reaction system exceeds the above defined range, it is disadvantageous in that the activity of the polymerization catalyst is drastically reduced, providing a polymer having an undesirably broader molecular distribution.

Examples of methods for reducing the water content in the reaction system to within the above defined range include (i) utilizing water in the reaction system as a raw material for the hydrolyzation of a carboxylic anhydride contained in the reaction system to a carboxylic acid, (ii) adsorbing water in the reaction system by an adsorbent such as molecular sieve, and (iii) subjecting THF and acetic anhydride to treatment with a drying agent, precision distillation, etc. to lower the water content therein. However, method (ii) is disadvantageous in that the adsorbent needs to be regenerated regularly to remove adsorbed water therefrom. Method (iii) is disadvantageous in that the dehydration of THF requires the use of metallic sodium, potassium hydroxide or the like as a drying agent or the use of an extremely precise distillation column. Thus, this method can be hardly effected on an industrial scale. Therefore, method (i) is the most desirable on an industrial basis.

As the hydrolyzation catalyst to be used in the method (i) there may be preferably used one selected from the group consisting of cation exchange resin having an amount of ion-exchangeable acid of not less than 0.001 mmol/g and solid acid catalyst.

More particularly, a Brønsted acid type solid acid catalyst having hydrolysis reactivity is desirable. Examples of such a solid acid catalyst include the following catalysts A to E:

A) Cation exchange resin such as vinylbenzenestyrene copolymer having —SO$_3$H groups (specific examples of such a cation exchange resin include strong acidity cation exchange resin such as Diaion SK Series and Diaion PK Series (available from Mitsubishi Chemical Corporation);

B) Acidic crystalline porous material such as zeolite;

C) Catalyst made of a clay compound containing Si and Al;

D) Hydrolysis catalyst obtained by a process which comprises calcining the precursor of an oxide or composite oxide of elements selected from the group consisting of Nb, Ta, Al, Re, P, S, V, W, Mo and Si at a temperature of from 150° C. to 450° C. (the calcining at a temperature of from 150° C. to 450° C. produces a Brønsted acidity. In this case, the Brønsted acid content of the catalyst must be not less than 0.001 mmol/g as ion-exchangeable amount of acid. If the precursor of the oxide is calcined at a temperature of lower than 150° C., the formation of a Brønsted acid by pyrolysis of the precursor of the oxide as a catalyst precursor is insufficient. On the contrary, if the precursor of the oxide is calcined at a temperature of higher than 450° C., it undergoes transformation from a Brønsted acid to a Lewis acid, making it impossible to obtain a sufficient amount of Brønsted acid); and E) Aluminum oxide obtained by treating aluminum hydroxide at a temperature of not lower than 400° C.

The desirable feature of the hydrolyzation catalysts A to E is that they have little or no polymerization activity with respect to a cyclic ether such as THF. If the hydrolyzation catalyst has some polymerization activity, the resulting PTMG disadvantageously has a broad molecular weight distribution.

Examples of methods for reducing the water content in the polymerization reaction system by hydrolyzing the carboxylic anhydride in the presence of a hydrolyzation catalyst such as A to E include (i) conducting hydrolyzation reaction prior to the polymerization reaction, and (ii) conducting the hydrolyzation reaction at the same time as the polymerization reaction.

An example of process (i) is (1) a process which comprises the decomposition and consumption of water present in the reaction system in the presence of at least one hydrolyzation catalyst selected from the group consisting of the foregoing ion exchange resin (A), zeolite (B), clay compound (C), composite oxide of specific metal (D) and aluminum oxide (E) as a catalyst for the hydrolyzation reaction of water with a carboxylic anhydride prior to the polymerization reaction.

Examples of the process (ii) include (2) a process which comprises allowing a polymerization catalyst and at least one hydrolyzation catalyst for the hydrolyzation reaction of carboxylic anhydride selected from the foregoing compounds (A) to (E) to be present in the polymerization reaction system as separate catalysts so as to decompose and consume water present in the reaction system, and (3) a process which comprises the decomposition and consumption of water present in the reaction system in the presence of a hydrolyzation catalyst/polymerization catalyst having the foregoing oxide (D) for the hydrolysis of carboxylic anhydride supported on an oxide of elements selected from the group consisting of Ge, Sn, Pb, B, Al, Ga, Zn, Cd, Cu, Fe, Mn, Ni, Cr, Mo, W, Ti, Zr, Hf, Y, La, Ce, Yb, Zn and Si and/or Lewis acid type composite oxide of two or more elements selected from the foregoing group of elements (The expression "hydrolyzation catalyst/polymerization catalyst" as used herein is meant to indicate a catalyst having a hydrolyzation catalyst supported on a polymerization catalyst which serves as both a hydrolyzation catalyst and a polymerization catalyst). Other examples of the process (ii) include (4) a process which comprises the reaction of water present in the reaction system in the presence of a polymerization catalyst/hydrolyzation catalyst obtained by calcining an oxide of elements selected from the group consisting of Ge, Sn, Pb, B, Al, Ga, Zn, Cd, Cu, Fe, Mn, Ni, Cr, Mo, W, Ti, Zr, Hf, Y, La, Ce, Yb, Zn and Si and/or Lewis acid type composite oxide of two or more elements selected from the foregoing group of elements on a metalosilicate zeolite having an Si/M ratio (M represents the sum of the amount of intra-lattice metallic components other than Si in metalosilicate zeolite) of not less than 10 at a temperature of from 600° C. to 1,100° C. (the expression "polymerization catalyst/hydrolyzation catalyst" as used herein is meant to indicate a catalyst having a polymerization catalyst supported on a hydrolyzation catalyst which serves as both a polymerization catalyst and a hydrolyzation catalyst. The Si/M ratio of not less than 10 is an indication of the assurance that the zeolite which serves both as a hydrolyzation catalyst and a catalyst carrier exhibits a sufficient heat resistance where the composite oxide is calcined to form a composite oxide which exhibits a sufficient polymerization activity); and (5) a process, prior to the polymerization reaction in the presence of a catalyst described in any of the processes (2) to (4), reacting at least a part of the water present in the reaction system in the presence of at least one hydrolyzation catalyst selected from the group consisting of the foregoing ion exchange resin (A), zeolite (B), clay compound (C), supported solid acid (D) and aluminum oxide (E) for hydrolyzation reaction of carboxylic anhydride so that the water is consumed for the formation of a carboxylic acid, and then effecting hydrolyzation reaction at the same time as the polymerization reaction.

As the foregoing solid acid catalysts (A) to (E) there may be preferably used those having an acid content of not less than 0.001 mmol/g as calculated in terms of ion-exchangeable amount of acid. The expression "ion-exchangeable amount of acid" as used herein is meant to indicate the end-point of titration with sodium hydroxide of free proton produced by ion-exchanging the catalyst with an aqueous solution of sodium chloride. This is a measure of the content of protonic acid. An example of a specific procedure for conducting this measurement is as follows:

Measurement of ion-exchangeable amount of acid 1 g of the catalyst is suspended in 10 cc of an aqueous NaCl solution prepared by dissolving 30 g of NaCl in 100 cc of water. The suspension is then stirred at a temperature of 0° C. for 30 minutes. The catalyst is then removed by filtration. The resulting reaction solution is then titrated with an aqueous solution of sodium hydroxide to produce free HCl from which the ion-exchangeable amount of acid is then calculated.

The foregoing processes (1) to (5) will be further described hereinafter.

In the pretreatment of the process (1), as the hydrolyzation catalyst there may be preferably used (A) ion exchange resin, (D) Brønsted acid type (composite) oxide of specific metal (particularly (composite) oxide of Nb and/or Si) or (E) aluminum oxide obtained by treating aluminum hydroxide at a temperature of not lower than 400° C. As the polymerization catalyst there may be preferably used (a) a Lewis acid type (composite) oxide (particularly (composite) oxide of Zr and/or Si).

In process (2), (D) hydrolyzable (composite) oxide (Brønsted acid type) is preferably used in combination with a Lewis acid type polymerization catalyst such as the foregoing composite oxide (i) from the standpoint of handleability and controllability over the desired molecular weight distribution.

In the process (3), in order to provide the foregoing polymerization catalyst (i) with a capability of catalyzing the hydrolyzation reaction of a carboxylic anhydride, the following process is effected. By way of further detail, a salt or alkoxide of one or more metallic elements selected from the group consisting of Nb, Ta, Al, P, S, V, W and Mo is supported on the foregoing polymerization catalyst (a). As the supporting method there may be used a coprecipitation method, sol-gel method, kneading method, impregnation method or the like. A particularly useful method which comprises allowing these metallic elements to be supported on a polymerization catalyst in the form of a salt or alkoxide, and following a formation of a catalyst precursor by contacting with a basic substance. The catalyst precursor (laminate) thus obtained is optionally recovered by filtration, washed, and then dried. The catalyst precursor (laminate) may then be calcined in an inert gas atmosphere such as nitrogen gas or argon gas or in an oxidizing gas atmosphere such as air or diluted oxygen gas to obtain the desired hydrolyzation catalyst/polymerization catalyst.

The calcining is normally effected at a temperature as relatively low as from 150° C. to 450° C., preferably from 250° C. to 400° C. Calcining at such a low temperature allows the formation of Brønsted acidity which catalyzes the reaction of the carboxylic anhydride with water. The hydrolyzation reaction thus catalyzed allows the consumption of water present in the reaction system, making it possible to keep the water content in the reaction system low. If calcining is effected at a temperature lower than the above defined range, the formation of a Brønsted acid by pyrolysis of hydrolyzation catalyst/polymerization catalyst is insufficient, making it impossible to provide a sufficient hydrolyzation activity. If the calcining is effected at a temperature higher than the above defined range, the Brønsted acid content is reduced thus causing the carboxylic anhydride to catalyze the hydrolyzation reaction less efficiently, making it impossible to sufficiently reduce the water content in the reaction system. Calcining at a temperature of from 150° C. to 450° C. allows the Brønsted acid content to increase to not less than 0.005 mmol/g as calculated in terms of ion-exchangeable amount of acid, making it possible to maintain the water content in the reaction system as sufficiently low as not more than 30 ppm by weight.

In this process, the foregoing polymerization catalyst (i), a catalyst having the foregoing oxide of Nb (D) supported on a (composite) oxide of Zr and/or Si is particularly preferred.

In the process (4), a composite oxide having a polymerization activity is supported on a zeolite having an Si/M ratio of not less than 10. In some detail, a solution of a salt or alkoxide of metallic elements selected from the group consisting of Ge, Sn, Pb, B, Al, Ga, Zn, Cd, Cu, Fe, Mn, Ni, Cr, Mo, W, Ti, Zr, Hf, Y, La, Ce, Yb, Zn and Si is mixed with a zeolite having an Si/M ratio of not less than 10 as a carrier to make a slurry or gel. An acid, alkali or water is optionally added to the slurry or gel to hydrolyze the metal salt or alkoxide. Thus, a precursor of polymerization catalyst/hydrolyzation catalyst is obtained.

The precursor of polymerization catalyst/hydrolyzation catalyst thus obtained is optionally recovered by filtration, washed, and then dried. The precursor of polymerization catalyst/hydrolyzation catalyst may then be calcined in an inert gas atmosphere such as nitrogen gas or argon gas or in an oxidizing gas atmosphere such as air or diluted oxygen gas to obtain the desired polymerization catalyst/hydrolyzation catalyst. The calcining is normally effected at a temperature of 400° C. to 1,100° C., preferably from 600° C. to 1,000° C. The calcining at such a high temperature advantageously enhances the activity and stability of the catalyst.

Needless to say, the zeolite as a carrier serves as the foregoing Brønsted acid type hydrolyzation catalyst (B).

As the supported metal, Zr is particularly preferred.

In process (5), the foregoing process (1) (pretreatment) and processes (2) to (4) (in-situ treatment) may be effected in combination.

In the present invention, either the foregoing pretreatment process (1) or in-situ treatment process (2), (3) or (4) may be effected to reduce the water content in the reaction system. In particular, from the standpoint of separation, regeneration and re-use of the various catalysts, a method is preferably employed which comprises, prior to the substantial progress of the ring opening polymerization of the cyclic ether, allowing a mixture of the cyclic ether and the carboxylic anhydride to come in contact with the foregoing hydrolyzation catalyst so that water present in the reaction system is consumed as a raw material of the conversion of the carboxylic anhydride to a carboxylic acid to reduce the water content in the reaction system.

As the carboxylic anhydride employable herein there may be preferably used one derived from a $C_{2-12}$, particularly $C_{2-8}$, aliphatic or aromatic poly- and/or monocarboxylic acid (with monocarboxylic acid being preferred).

Examples of the aliphatic carboxylic anhydride include acetic anhydride, butyric anhydride, propionic anhydride, valeric anhydride, caproic anhydride, caprylic anhydride, and pelargonic anhydride. Examples of the aromatic carboxylic anhydride include phthalic anhydride, naphthalinic anhydride. Examples of the aliphatic polycarboxylic anhydride include succinic anhydride, and maleic anhydride. Particularly preferred among these carboxylic anhydrides is acetic anhydride taking into account the effect, cost and availability. The carboxylic anhydride is preferably added in an amount of from 0.01 to 1.0 mols per mol of the cyclic ether.

PTMG prepared using such an acid anhydride contains an ester with this acid (PTME). This PTME needs to be subjected to hydrolyzation or alcoholysis to convert itself to PTMG.

In the present invention, a polar solvent may be added to the reaction system as an auxiliary for preventing the overpolymerization of the reaction system to adjust the molecular weight distribution thereof. Examples of the polar solvent include alcohols such as methanol, ethanol, isopropanol, ethylene glycol and 1,4-butanediol, formamide, dimethyl formamide, and dimethyl acetamide. The amount of such an auxiliary to be used is normally from $10^{-4}$ to 0.5 mol per mol of the cyclic ether.

Referring to the reaction process, any common reaction vessel such as a tank type vessel or column type vessel may be used. Either a batchwise process or continuous process may be employed.

By way of further detail, either a process which comprises charging a cyclic ether, a carboxylic anhydride and a catalyst into a reaction vessel where they are then subjected to polymerization (batchwise process) or a process which comprises continuously supplying a reaction composition solution containing a cyclic ether and a carboxylic anhydride into a reaction vessel filled with a catalyst while the reaction solution is being withdrawn continuously (continuous process) may be employed.

The amount of polymerization catalyst to be used depends on the nature thereof and thus is not specifically limited. In the batchwise reaction vessel, for example, if the amount of the catalyst is too small, the polymerization rate is too low. On the contrary, if the amount of the catalyst is too large, the heat of endothermic polymerization cannot be controlled by cooling. Further, the reaction system exhibits too high a slurry concentration to stir. Moreover, the separation of the catalyst which has been used in the polymerization reaction from the reaction solution cannot readily be effected. In particular, the amount of the foregoing (composite) oxide polymerization catalyst (i), if used, may be normally selected from the range of 0.001 to 50 times, preferably 0.01 to 20 times the weight of the liquid phase, taking into account the reaction type, i.e., whether it is batchwise or continuous. However, if the reaction is continuous, the amount of the polymerization catalyst to be used indicates the amount of the catalyst with respect to the supplied amount of liquid phase per unit time.

The temperature applied for the ring opening polymerization reaction is normally from 0° C. to 200° C., preferably from 10° C. to 80° C. The reaction pressure may be such that the reaction system can maintain a liquid phase. It is normally selected from the range of normal pressure to 10 MPa, preferably normal pressure to 5 MPa. The reaction time is not specifically limited but is normally from 0.1 to 20 hours, preferably from 0.5 to 15 hours taking into account the compatibility with the amount of the catalyst, the yield of PTME and the economy of the process. The expression "reaction time" as used herein is meant to indicate the time required between the point at which the reaction temperature is reached and the point at which the reaction is terminated to cause the reaction system to begin to cool in the batchwise process or the retention time of the reaction composition solution in the reaction vessel in the continuous process.

The distribution of molecular weight in the polyoxyalkylene glycol produced by the polymerization reaction according to the present invention depends on the particular cyclic ether used. For example, if THF is polymerized, a low to medium molecular weight PTMG having a number-average molecular weight (Mn) of from 200 to 80,000, particularly from 200 to 40,000 can be obtained. One of the features of the present invention is that PTMG having a narrow molecular weight distribution represented by weight-average molecular weight/number-average molecular weight (Mw/Mn) can be easily produced. In other words, PTMG having a Mw/Mn of less than 20, e.g., from 1.0 to 10.0 can be produced. Further, PTMG having a Mw/Mn of from 1.0 to 4.0, particularly from 1.1 to 3.0, which is industrially in much demand, can be obtained. Even further, by selecting preferred conditions within the present invention, PTMG having a very narrow molecular weight distribution, e.g., Mw/Mn of from about 1.1 to 2.0, can be obtained. Accordingly, in accordance with the present invention, a very industrially useful PTMG having a relatively low molecular weight, e.g., a number-average molecular weight of from 500 to 3,000, particularly from 700 to 2,000, and a very narrow molecular weight distribution, e.g., Mw/Mn of from 1.1 to 3.0, particularly from 1.1 to 2.0, can be produced.

As previously mentioned, the foregoing (composite) oxide is preferably used as a polymerization catalyst in the present invention. A feature of this catalyst system is that the recovery of unreacted cyclic ether and carboxylic acid, the removal of the polymer thus obtained and the regeneration of the catalysts can be easily effected. For example, in the batchwise reaction process, the termination of the reaction may be immediately followed by the separation by filtration of the catalysts from the reaction solution from which the unreacted cyclic ether and carboxylic anhydride are distilled off to obtain the desired polymer. Further, the catalyst which has been used in the reaction may be thoroughly washed, and then subjected to combustion so that organic materials attached thereto can be burned away to provide easy recovery of the activity thereof.

The present invention will be further described in the following examples, but the present invention should not be construed as being limited thereto.

The expressions and terms "reaction initiation time", "Mn", "Mw", and "yield $\phi$" as used hereinafter have the following meanings.

Reaction initiation time: Time at which the reaction vessel is dipped in the water bath which has been kept at the predetermined reaction temperature Yield ($\phi$): The proportion (wt-%) of acetic ester of PTMG to supplied THF (The hour in the parenthesis after "$\phi$" indicates the reaction time. In other words, "$\phi$ (Xhr)" indicates the yield after X hours.)

Mn: Number-average molecular weight measured by gel permeation chromatography

Mw: Weight-average molecular weight measured by gel permeation chromatography

Mw/Mn (Xhr) indicates Mw/Mn after X hours.

EXAMPLE 1

50 g of a commercially available $SiO_2$ carrier (CARiACT Q-15, available from Fuji Silicia Chemical Corp.; 10 to 20 mesh) was dipped in 70 ml of a methanol solution of 11.7 g of zirconium oxynitrate dihydrate, 9.1 g of tetraethyl silicate and 5.7 g of urea. The reaction mixture was then distilled at 60° C. under reduced pressure to remove methanol therefrom. The resulting solid was heated in a stream of air to 120° C. in 1 hour and then to 800° C. in 2 hours and 30 minutes. The solid was kept at 800° C. for 3 hours, and then allowed to cool. The $ZrO_2/SiO_2$ catalyst thus obtained exhibited an amount of ion-exchangeable acid of 0.005 mmol/g. The $ZrO_2/SiO_2$ catalyst thus prepared was then dipped in a methanol solution of $NbCl_5$ and urea in an amount of 1 mol-% and 2.5 mol-% based on $SiO_2$, respectively. The reaction mixture was dried under reduced pressure to remove methanol therefrom, pyrolized at 120° C., and then calcined at 300° C. for 10 hours.

As a result, a catalyst having the structure 1 mol-% $Nb_2O_5$-5 mol-% $ZrO_2/SiO_2$ was obtained. The catalyst thus obtained exhibited an ion-exchangeable acid amount of 0.047 mmol/g.

Polymerization reaction

The foregoing $Nb_2O_5$—$ZrO_2/SiO_2$ catalyst was packed into a cylindrical reaction vessel and reaction was carried out at a temperature of 40° C., a tetrahydrofuran/acetic anhydride molar ratio of 1/0.036 and LHSV of 0.5 ($hr^{-1}$). During this reaction, the water content in the mixture of THF and acetic anhydride was 130 ppm by weight. The water content at the outlet of the reaction vessel fell below the lowest detectable value (10 ppm by weight). This demonstrates that acetic anhydride was hydrolyzed by water to form acetic acid. The percent reduction of conversion ($\phi$) of tetrahydrofuran is defined as follows:

% Activity retention=$\phi$ (500 hr)/$\phi$(200 hr)×100 The magnitude of spread of molecular weight distribution is defined as follows:

Molecular weight distribution deterioration={Mw/Mn (500 hr)}/{Mw/Mn (200 hr)}

The catalyst exhibited a percent activity retention of 58% and a molecular weight distribution deterioration of 1.03.

EXAMPLE 2

Preparation of hydrolyzation catalyst 56 g of a commercially available $SiO_2$ carrier (CARiACT Q-15, available from Fuji Silicia Chemical Corp.; 10 to 20 mesh) was dipped in 58 ml of a methanol solution of 7.79 g of niobium chloride (V). Methanol as a solvent was then distilled off at 60° C. under reduced pressure. The resulting dried solid was then packed into a quartz glass tube. Nitrogen gas was passed through a 28% aqueous solution of ammonia at room temperature at a flow rate of 300 ml/min., and then supplied into the quartz glass tube for 20 minutes.

As a result, heat generation immediately occurred. Nitrogen gas was then passed through the quartz glass tube. The solid was washed until the pH value of the filtrate reached 7, and then dried at 120° C. overnight. The solid thus dried was packed into a quartz glass tube, kept at a temperature of 300° C. for 10 hours, and then allowed to cool. The $Nb_2O_5/SiO_2$ catalyst thus obtained exhibited an amount of ion-exchangeable acid of 0.04 mmol/g.

Preparation of polymerization catalyst 50 g of a commercially available $SiO_2$ carrier (CARiACT Q-15, available from Fuji Silicia Chemical Corp.; 10 to 20 mesh) was dipped in 70 ml of a methanol solution of 11.7 g of zirconium oxynitrate dihydrate, 9.1 g of tetraethyl silicate and 5.7 g of urea. Methanol as a solvent was then distilled off at 60° C. under reduced pressure. The resulting solid was heated in a stream of air to 120° C. in 1 hour and then to 800° C. in 2 hours and 30 minutes. The solid was kept at 800° C. for 3 hours, and then allowed to cool. The $ZrO_2/SiO_2$ catalyst thus obtained exhibited an amount of ion-exchangeable acid of 0.005 mmol/g.

Polymerization reaction

The $Nb_2O_5/SiO_2$ hydrolyzation catalyst and $ZrO_2/SiO_2$ polymerization catalyst thus prepared were then packed into a pre-stage cylindrical reaction vessel and a post-stage cylindrical reaction vessel, respectively. The two reaction vessels were then connected in series. In this reaction system, reaction was effected in the same manner as in Example 1. During this process, the pre-stage cylindrical reaction vessel was kept at a temperature of 40° C.

The reaction solution which had been passed through the pre-stage cylindrical reaction vessel was sampled for examination. As a result, the reaction solution was found to have undergone no polymerization reaction. The water content in the mixture of THF and acetic anhydride was found to be 130 ppm b y weight shortly before the pre-stage reaction vessel and not more than 10 ppm by weight (below the lowest detectable value) after the pre-stage react ion vessel.

The product recovered at the outlet of the post-stage reaction vessel showed that the catalyst used had a percent activity retention of 83% and a molecular weight distribution deterioration of 1.02.

EXAMPLE 3

The procedure of polymerization reaction was followed except that as the hydrolyzation catalyst there was used aluminum oxide obtained by calcining Boehmite (PURAL SB, available from Condea Japan K.K.) at 600° C. The reaction solution which had been passed through the pre-stage cylindrical reaction vessel was sampled for examination. As a result, the reaction solution was found to have undergone no polymerization reaction. The water content in the mixture of THF and acetic anhydride was found to be 130 ppm by weight shortly before the pre-stage reaction vessel and not more than 10 ppm by weight (below the lowest detectable value) after the pre-stage reaction vessel.

The product recovered at the outlet of the post-stage reaction vessel showed that the catalyst used had a percent activity retention of 80% and a molecular weight distribution deterioration of 1.03.

Comparative Example 1

50 g of the same $SiO_2$ carrier as used in Example 1 was dipped in 70 ml of a methanol solution of 11.7 g of zirconium oxynitrate dihydrate, 9.1 g of tetraethyl silicate and 5.7 g of urea. Methanol was then distilled off at 60° C. under reduced pressure. The resulting solid was heated in a stream of air to 120° C. in 1 hour and then to 800° C. in 2 hours and 30 minutes. The solid was kept at 800° C. for 3 hours, and then allowed to cool. The $ZrO_2/SiO_2$ catalyst thus obtained exhibited an amount of ion-exchangeable acid of 0.005 mmol/g.

Polymerization reaction

The $ZrO_2/SiO_2$ catalyst thus obtained was then packed into a cylindrical reaction vessel. A reaction was then effected in the same manner as in Example 1. During this reaction, the water content in the mixture of THF and acetic anhydride was 130 ppm by weight. The water content at the outlet of the reaction vessel was 50 ppm by weight. However, as a result of this reaction, the percent activity retention was only 13% and the molecular weight distribution deterioration was 1.07. This is probably because that although the water content in the reaction system is apparently reduced by the adsorption by the catalyst, the adsorbed water deactivates the catalyst. Thus, the activity of the catalyst is drastically reduced as compared with Examples 1 to 3, where the water content is consumed during hydrolyzation.

As mentioned above, the present invention provides a process which comprises the ring opening polymerization of a cyclic ether in the presence of a carboxylic anhydride and a catalyst to prepare an ester of polyoxyalkylene glycol, wherein the catalyst used can be easily separated and the reduction in the activity of the catalyst is inhibited. Thus, a polyoxyalkylene glycol having an industrially useful molecular weight and a narrow molecular weight distribution can be prepared.

What is claimed is:

1. A process for the polymerization of a cyclic ether which comprises carrying out a ring opening polymerization of a cyclic ether in the presence of a carboxylic anhydride and a solid acid polymerization catalyst to provide a polymer esterified at some or all of the ends thereof, wherein the water content in the reaction system is reduced by the hydrolyzation of the carboxylic anhydride in the presence of a hydrolyzation catalyst.

2. The process according to claim 1, wherein said solid acid polymerization catalyst is an oxide of an element selected from the group consisting of Ge, Sn, Pb, B, Al, Ga, Zn, Cd, Cu, Fe, Mn, Ni, Cr, Mo, W, Ti, Zr, Hf, Y, La, Ce, Yb, Zn and Si and/or a composite oxide of two or more elements selected from the foregoing group of elements, and which has been calcined at a temperature of from 600° C. to 1,150° C.

3. The process according to claim 1, wherein said hyrolyzation catalyst is at least one catalyst substantially free of polymerization activity with respect to the cyclic ether, and is selected from the group consisting of a cation exchange resin having an amount of ion-exchangeable acid of not less than 0.001 mmol/g and a solid acid catalyst.

4. The process according to claim 3, wherein said hydrolyzation catalyst is an oxide of an element selected from the group consisting of Nb, Ta, Al, Re, P, S, V, W, Mo and Si, or a composite oxide thereof, and which has been calcined at a temperature of from 150° C. to 450° C.

5. The process according to claim 3, wherein said solid acid catalyst to be used as a hyrolyzation catalyst is aluminum oxide obtained by treating aluminum hydroxide at a temperature of not less than 400° C.

6. The process according to claim 1, wherein a mixture of cyclic ether and carboxylic anhydride is contacted with said hydrolyzation catalyst prior to the polymerization reaction.

7. The process according to claim 1, wherein said polymerization catalyst and hydrolyzation catalyst are both present in the polymerization reaction system as separate catalysts.

8. The process according to claim 1, wherein the polymerization reaction and hydrolyzation reaction are effected in the presence of a hydrolyzation catalyst/polymerization catalyst obtained by a process which comprises allowing a precursor of an oxide of an element selected from the group consisting of Nb, Ta, Al, Re, P, S, V, W, and Mo to be supported on an oxide of an element selected from the group consisting of Ge, Sn, Pb, B, Al, Ga, Zn, Cd, Cu, Fe, Mn, Ni, Cr, Mo, W, Ti, Zr, Hf, Y, La, Ce, Yb, Zn and Si and/or a composite oxide of two or more elements selected therefrom to form a catalyst precursor, wherein said oxide and/or said composite oxide have been formed by calcining at a temperature of from 600° C. to 1,150° C., and then calcining the catalyst precursor at a temperature of from 150° C. to 450° C.

9. The process according to claim 1, wherein said cyclic ether is tetrahydrofuran.

10. The process according to claim 1, wherein said carboxylic anhydride is acetic anhydride.

11. The process according to claim 1, wherein the water content in the reaction system is maintained at not more than 30 ppm by weight during the polymerization reaction.

12. The process according to claim 1, wherein the water content in the reaction system is maintained at not more than 10 ppm by weight during the polymerization reaction.

* * * * *